United States Patent
Heibel et al.

(10) Patent No.: US 10,600,523 B2
(45) Date of Patent: Mar. 24, 2020

(54) PANEL ASSEMBLY HAVING VARIABLE TRANSMISSIVITY AND STRUCTURAL RIGIDITY

(71) Applicant: Westinghouse Electric Company LLC, Cranberry Township, PA (US)

(72) Inventors: Michael D. Heibel, Harrison City, PA (US); Luke D. Czerniak, Mount Pleasant, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/211,450

(22) Filed: Dec. 6, 2018

(65) Prior Publication Data

US 2019/0172599 A1  Jun. 6, 2019

Related U.S. Application Data

(60) Provisional application No. 62/595,225, filed on Dec. 6, 2017.

(51) Int. Cl.

| | | |
|---|---|---|
| *G01J 1/42* | (2006.01) | |
| *G21F 3/00* | (2006.01) | |
| *E06B 5/18* | (2006.01) | |
| *G01T 1/16* | (2006.01) | |
| *G21F 1/08* | (2006.01) | |
| *G01T 3/00* | (2006.01) | |
| *G21F 1/02* | (2006.01) | |
| *F15B 21/06* | (2006.01) | |
| *F16F 13/30* | (2006.01) | |

(52) U.S. Cl.
CPC .................. *G21F 3/00* (2013.01); *E06B 5/18* (2013.01); *G01T 1/16* (2013.01); *G01T 3/00* (2013.01); *G21F 1/023* (2013.01); *G21F 1/08* (2013.01); *F15B 21/065* (2013.01); *F16F 13/305* (2013.01)

(58) Field of Classification Search
CPC ... G21F 3/00; G21F 1/023; G21F 1/08; G01T 1/16; G01T 3/00; E06B 5/18; F15B 21/065
See application file for complete search history.

(56) References Cited

U.S. PATENT DOCUMENTS

| | | | |
|---|---|---|---|
| 2013/0186473 A1* | 7/2013 | Mankame | F15B 21/065 137/13 |
| 2014/0106635 A1* | 4/2014 | Junior | C08L 7/00 442/1 |
| 2016/0232995 A1* | 8/2016 | Heibel | G21C 7/00 |

OTHER PUBLICATIONS

L. Vekas, "Ferrofluids and Magnetorheological fluids," 2008, Advances in Science and Technology, ISSN: 1662-0356, vol. 54, pp. 127-136. (Year: 2008).*

* cited by examiner

*Primary Examiner* — Kiho Kim
(74) *Attorney, Agent, or Firm* — K&L Gates LLP

(57) ABSTRACT

A system that utilizes a very thin arrangement of transparent sub panels containing embedded very small distributed electromagnet wires to control the distribution of very fine magneto-rheological fluid particles suspended in a very thin panel sandwiched between the electromagnet wire panels. The current applied to specific electromagnets may be used to control the amount of electromagnetic energy, such as visible light, that can be transmitted through the panel system. The system may also be used to increase or decrease the rigidity of the multi-panel structure as a function of current applied to the electromagnets.

17 Claims, 2 Drawing Sheets

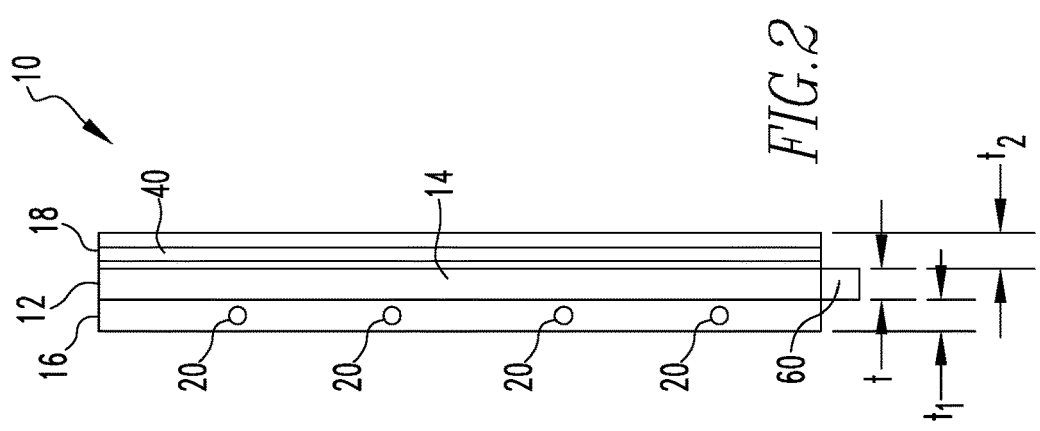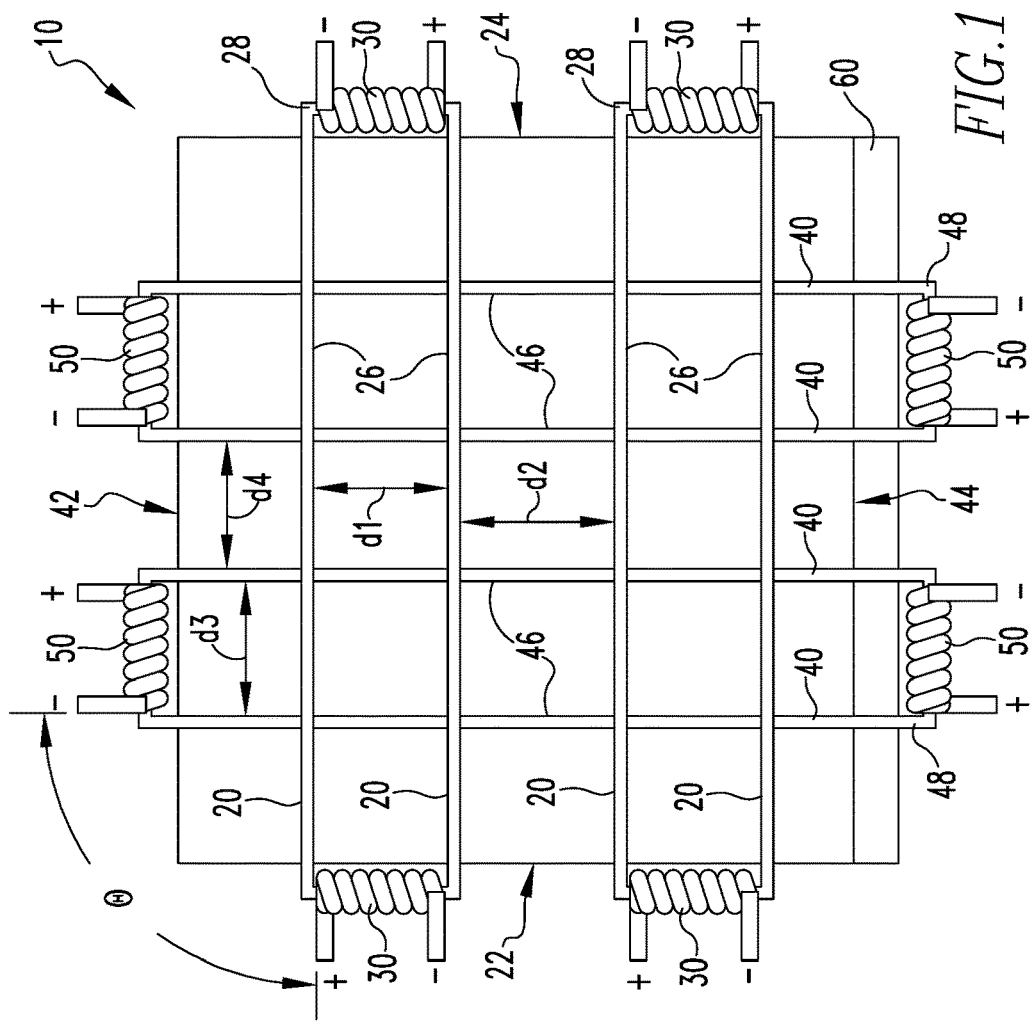

PANEL ASSEMBLY HAVING VARIABLE TRANSMISSIVITY AND STRUCTURAL RIGIDITY

CROSS-REFERENCE TO RELATED APPLICATIONS

This patent application claims the priority benefit under 35 U.S.C. § 119(e) of U.S. Provisional Application No. 62/595,225 filed on Dec. 6, 2017, the contents of which are herein incorporated by reference.

BACKGROUND

1. Field

The disclosed concept pertains generally to smart glass technology and, more particularly, to a transparent panel assembly that employs a magneto-rheological fluid to control the transmissivity of radiation through the assembly.

2. Related Art

The ability to control the intensity of visible light transmitted through a window using Smart Glass technology currently requires the use of relatively expensive manufacturing techniques involving the use of electric fields and potentially toxic chemicals. The techniques currently used provide uniform intensity transmission changes to the entire panel. Many applications of such "smart glass" technology would be greatly benefited by the capability to utilize a very inexpensive and easily scalable approach that allows the light transmission in a very localized area to be altered without the use of potentially toxic or expensive chemical elements. The usefulness of this technology would also be greatly improved if the method used to alter the transmission of light could also alter the strength of the panel to increase the resistance of the panel to breaking from an impact.

SUMMARY

Embodiments of the disclosed concept provide a panel assembly that is transparent to a preselected form of radiation that is configured to selectively vary the transmissivity of the preselected form of radiation through the panel assembly. The panel assembly comprises: a first transparent sub panel including a plurality of generally parallel, spaced, first wires extending therethrough from a first edge to an opposite, second edge with at least an end of each first wire connected to an end of an adjacent first wire at one of the first edge or the second edge to form a plurality of U-shaped conductive elements, each U-shaped conductive element having an electromagnetic coil wound thereabout at or about the first edge or the second edge of the first transparent sub panel to form a "horseshoe" electromagnet at each of the connected first wires; a second transparent sub panel including a plurality of generally parallel, spaced, second wires extending therethrough from a third edge to an opposite, fourth edge with at least an end of each second wire connected to an end of an adjacent second wire at one of the third edge or the fourth edge to form a second plurality of U-shaped conductive elements, each U-shaped conductive element of the second plurality having an electromagnetic coil wound thereabout at or about the third edge or the fourth edge of the second transparent sub panel to form a "horseshoe" electromagnet at each of the connected second wires; and a magneto-rheological fluid reservoir sandwiched between the first transparent sub panel and the second transparent panel, the reservoir being structured to house a volume of a magneto-rheological fluid.

The panel assembly may further comprise a volume of a magneto-rheological fluid disposed in the reservoir, wherein the magneto-rheological fluid comprises a quantity of magnetic particles.

The reservoir may comprise a reservoir extension which extends from the reservoir beyond one of the first, second, third or fourth edges of the first and second sub panels, and wherein the magnetic particles are disposed in the reservoir extension when none of the electromagnetic coils are energized.

The first wires and the second wires may extend at an angle of approximately 90° with respect to each other.

The panel assembly may further comprise a control system structured to separately control a supply of electrical current supplied to each of the respective electromagnetic coils.

The preselected form of radiation may be electromagnetic radiation.

The panel assembly may further comprise an electromagnetic radiation detector structured to track a path of the electromagnetic radiation and supply the path to the control system, and to selectively activate the electromagnetic coils which correspond to a location in the panel assembly which intersects with the path.

The electromagnetic radiation detector may be one or more photo sensors.

The panel assembly may have an inside surface and an outside surface and the photo sensors may be supported adjacent the inside surface.

The preselected form of radiation may comprise thermal neutrons.

The preselected form of radiation may comprise X-rays.

The magnetic particles may comprise iron.

The magneto-rheological fluid may comprise an alcohol.

A concentration of the magnetic particles in a portion of the panel assembly may increase the strength of that portion.

The first transparent sub panel and the second transparent sub panel may each be formed from a clear glass or plastic.

The first wires and the second wires, respectively, may be embedded within the first sub panel and the second sub panel.

The first wires and the second wires, respectively, may be attached to the first sub panel and the second sub panel.

BRIEF DESCRIPTION OF THE DRAWINGS

A further understanding of the invention can be gained from the following description of the preferred embodiments when read in conjunction with the accompanying drawings in which:

FIG. 1 is a schematic representation of a front elevation view of a panel assembly in accordance with one example embodiment of the disclosed concept;

FIG. 2 is a schematic representation of a side elevation view of the panel assembly of FIG. 1.

DESCRIPTION OF THE PREFERRED EMBODIMENT

Figure 3:
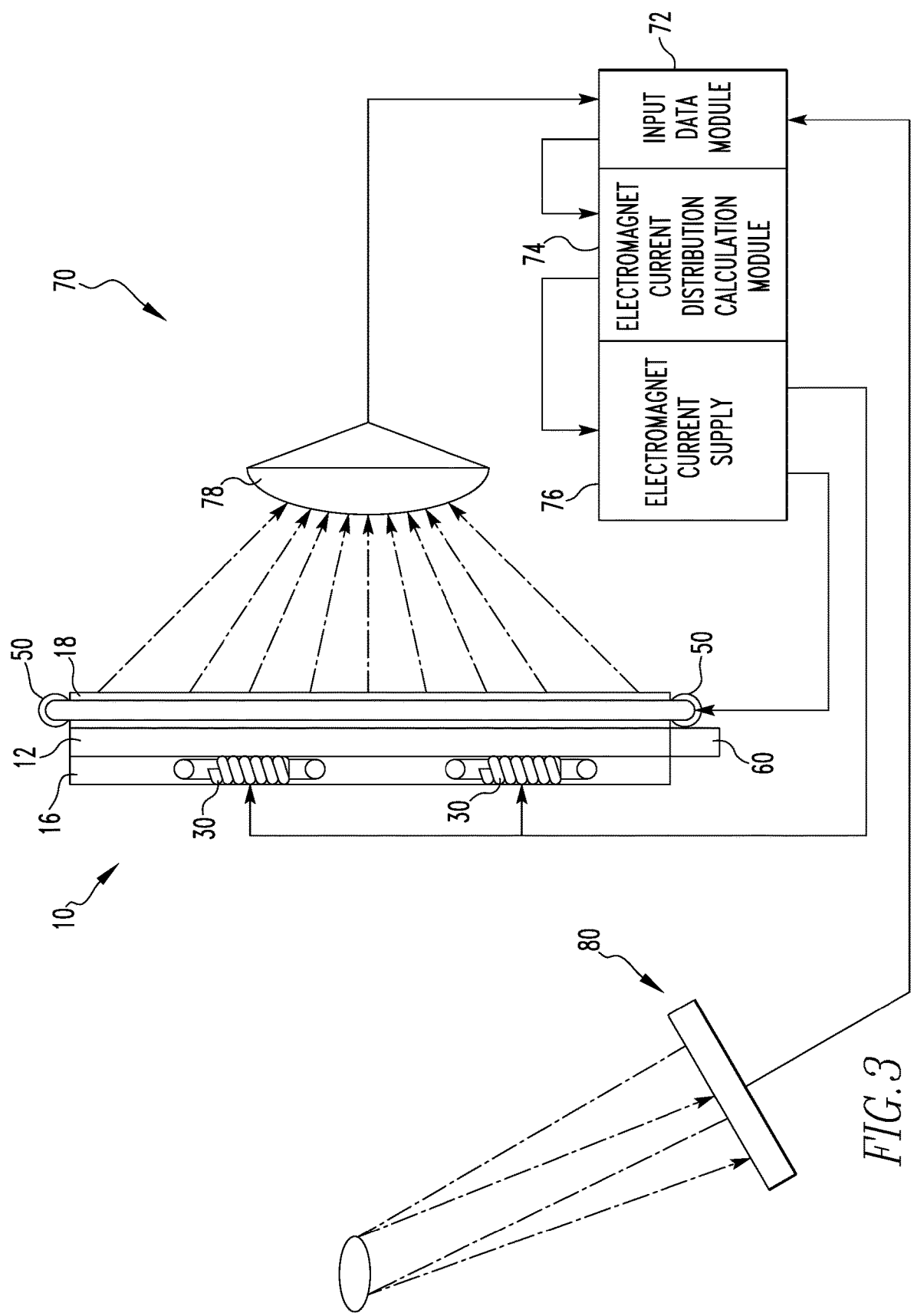
FIG. 3 is a schematic representation of a system employing the panel assembly of FIGS. 1 and 2.

Embodiments of the disclosed concept employ magneto-rheological technology to control the transmissivity of radiation through an otherwise transparent panel assembly. As described in U.S. Patent Application Pub. No. 2016/0232995, assigned to the Assignee of the concept disclosed herein, a magneto-rheological fluid has effective density and composition properties that change when a magnetic field is applied across the fluid. A typical magneto-rheological fluid comprises very small ferro-magnetic spheres suspended in some type of viscous fluid. The magnetic particles, which are typically of micrometer or nanometer scale spheres or ellipsoids, are suspended within the carrier fluid and are distributed randomly and in suspension under normal circumstances. When a magnetic field is applied, however, the microscopic particles align themselves along the lines of magnetic flux.

FIGS. 1 and 2, respectively, provide front and side views of a panel assembly 10 in accordance with an example embodiment of the disclosed concept. Panel assembly 10 includes a very thin (e.g., having a thickness t (FIG. 2) of approximately 5 mm) reservoir 12 (FIG. 2) constructed of a transparent material (e.g., glass or clear plastic), which is filled with a magneto-rheological fluid 14 (e.g., alcohol) that is transparent when the suspended magnetic particles of the magneto-rheological fluid 14 are absent. Panel assembly 10 further includes a first sub panel 16 and a second sub panel 18 which are disposed on opposite sides of reservoir 12 such that reservoir 12 is sandwiched between sub panels 16 and 18, as best appreciated from the side view of FIG. 2.

Continuing to refer to FIGS. 1 and 2, first sub panel 16 is a generally thin structure formed from a transparent material (e.g., glass or clear plastic) and includes a plurality of first wires 20 approximately 0.1 mm in diameter embedded therein. In example embodiments, first sub panels 16 having a thickness $t_1$ (FIG. 2) of approximately 1 mm have been employed, however, it is to be appreciated that other thicknesses $t_1$ may be employed without varying from the scope of the disclosed concept. First wires 20 extend in a generally parallel, spaced arrangement from a first edge 22 of first sub panel 16 to an opposite, second edge 24 of first sub panel 16. In the example illustrated in FIG. 1, first wires 20 are connected in pairs 26 at or near both of first edge 22 and second edge 24 of first sub panel 16 such that each pair 26 of first wires 20 forms a pair of U-shaped conductive elements connected together so as to form a conductive loop 28. An electromagnetic coil 30 is wound around each U-shaped element of each conductive loop 28 at or about first edge 22 and second edge 24 of first subpanel 16 such that each conductive loop 28 acts as a linked dual "horseshoe" electromagnet when current is applied to electromagnetic coils 30 thereof. Alternatively, first wires 20 may be connected in pairs 26 at or near only one of first edge 22 or second edge 24 of first sub panel 16 such that each pair 26 of first wires 20 forms a U-shaped conductive element. In such arrangement, an electromagnetic coil 30 is wound around the connection between the two wires 20 such that each U-shaped element acts as a "horseshoe" electromagnet when current is applied to the electromagnetic coil 30.

Continuing to refer to FIG. 1, first wires 20 of a given pair 26 are spaced a first distance d1 from each other, while each pair 26 of first wires 20 is spaced a second distance d2 from each other. The particular values of first distance d1 and second distance d2 may be varied depending on a particular application. The spacings should be sufficient to ensure suitable uniformity in magnetic field strength between wires (e.g. approximately 3 mm).

Second sub panel 18 is of generally the same arrangement as first sub panel 16 but just positioned at an angle θ with respect to first sub panel 16. Angle θ may be adjusted to achieve a desired MR fluid directional control. In example embodiments of the disclosed concept, angles θ at or about 90° have been employed. Accordingly, second sub panel 18 likewise is a generally thin structure formed from a transparent material (e.g., glass, plastic) and includes a plurality of second wires 40 (of the same or similar dimensions as first wires 20) embedded therein. In example embodiments, second sub panels 18 having a thickness $t_2$ (FIG. 2) of approximately 1 mm have been employed, however, it is to be appreciated that other thicknesses $t_2$ may be employed without varying from the scope of the disclosed concept. Second wires 40 extend in a generally parallel, spaced arrangement from a third edge 42 of second sub panel 18 to an opposite, fourth edge 44 of second sub panel 18. In the example illustrated in FIG. 1, second wires 40 are connected in pairs 46 at or near both of third edge 42 and second edge 44 of second sub panel 16 such that each pair 46 of second wires 40 forms a pair of U-shaped conductive elements connected together so as to form a conductive loop 48. An electromagnetic coil 50, similar to electromagnetic coil 30, is wound around each U-shaped element of each conductive loop 48 at or about third edge 42 and fourth edge 44 of second subpanel 18 such that each conductive loop 48 acts as a linked dual "horseshoe" electromagnet when current is applied to electromagnetic coils 50 thereof. Alternatively, second wires 40 may be connected in pairs 46 at or near only one of third edge 42 or fourth edge 44 of second sub panel 18 such that each pair 46 of second wires 40 forms a U-shaped conductive element. In such arrangement, an electromagnetic coil 50 is wound around the connection between the two wires 40 such that each U-shaped element acts as a "horseshoe" electromagnet when current is applied to the electromagnetic coil 50.

Continuing to refer to FIG. 1, second wires 40 of a given pair 46 are spaced a third distance d3 from each other, while each pair 46 of second wires 40 is spaced a fourth distance d4 from each other. The particular values of third distance d3 and fourth distance d4 may be varied depending on a particular application, however, typically these dimensions will be the same as first and second distances d1 and d2 previously discussed.

It is to be appreciated that the arrangement shown in FIGS. 1 and 2 is provided for exemplary purposes only and that one or more of the quantity/sizing of first or second wires 20 or 40 and/or the relative spacings d1, d2, d3 and d4 of such elements may be varied to meet the requirements of a particular application without varying from the scope of the disclosed concept.

The static and dynamic distribution and density of magnetic particles, such as iron particles, at any desired location in magneto-rheological fluid 14 in reservoir 12 can be controlled by the proper adjustment of the supplied current level and the timing of the current applied to individual electromagnet coils 30, 50 in each of first and second sub panels 16 and 18.

In the illustrated example embodiment of the disclosed concept, panel assembly 10 further includes a reservoir extension 60 which is an extension of reservoir 12 which extends beyond first and second sub panels 16 and 18 at the bottom of panel assembly 10. In such arrangement, magnetic particles present in magneto-rheological fluid 14 move to reside in reservoir extension 60 positioned at the lowest point of gravitational or centripetal potential when the electromagnetic coils 30 and 50 are not energized. Such arrangement ensures that maximum transparency of panel assembly 10 is obtained when electromagnetic coils 30 and 50 are not energized. When energized, electromagnetic coils 30 and 50 operate in a sequence to transport the magnetic particles from reservoir extension 60 and provide a uniform transparency across panel assembly 10 as dictated by user preferences (e.g., vertical relative motion of the particles is provided by the horizontal magnets and horizontal relative motion is produce by activation of the vertical magnets).

Referring now to FIG. 3, a schematic representation of a system 70 employing the panel assembly 10 of FIGS. 1 and 2 will now be described. System 70 includes: a panel assembly 10 such as previously described in conjunction with FIGS. 1 and 2, and a control system 72 connected to electromagnetic coils 30 and 50 of panel assembly 10. More particularly, control system 72 includes a processing portion 74 and a electromagnet current supply portion 76.

Processing portion 74 may be, for example, a microprocessor, a microcontroller or some other suitable processing device, and a memory portion that may be internal to the processing portion or operatively coupled to the processing portion and that provides a storage medium for data and software executable by the processing portion for controlling the operation of panel assembly 10. The memory portion can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

Electromagnet current supply portion 76 is connected to/controlled by processing portion 74 and is connected to each of the individual electromagnetic coils 30 and 50 and is structured to provide different currents to each of electromagnetic coils dependent on instructions/control provided by processing portion 74.

Continuing to refer to FIG. 3, system 70 may include a number of light sensors 78 connected to control system 72. As employed herein, the term "number" shall mean one or an integer greater than one (i.e., a plurality). Control system 72 has the capability to automatically change the density of the magnetic particles in magneto rheological fluid 14 at any location in panel assembly 10 in response to external deviations from a user selected base transparency level through input provided by the number of light sensors 78. An example of a desired distribution is maintaining each controlled section of panel assembly 10 below a maximum intensity.

In addition to selective control of transmissivity of panel assembly 10, the structural rigidity of panel assembly 10 can also be controlled both for the entire panel assembly 10 and for specific locations on panel assembly 10 by control system 72. This is accomplished by changing the current distribution required to achieve a uniform magnetic particle distribution, or by adjusting the current distribution to change the concentration of magnetic particles at a desired location within reservoir 12 of panel assembly 10. In the example illustrated in FIG. 3, system 70 includes an electromagnetic radiation transmission/reflection measurement device 80 (e.g., an EMR transmitter/receiver array) connected to control system 72. Device 80 may be used to detect the velocity and gravity induced deflection of a mass moving toward the surface of panel assembly 10. Control system 72 utilizes transmission/reflection data received from device 80 to adjust the distribution and strength of the currents applied to electromagnetic coils 30 and 50 as required to selectively adjust/optimize the stiffness of panel assembly 10 at the projected point of impact. An example of this optimization is adjusting the stiffness of areas around the impact area to dampen the stress waves produced during and following the impact as needed to reduce the possibility of the object penetrating the device.

An example system in accordance with the disclosed concept could also be configured to reduce the intensity of nuclear radiation exposure to the user. For example, by employing iron-boride particles as the magnetic particles in magneto-rheological fluid 14 of reservoir 12, magneto-rheological fluid 14 would be able to significantly reduce thermal neutron transmission through panel assembly 10. Simply increasing the density of iron in magneto-rheological fluid 14 and allowing the panel assembly 10 to generate a higher magnetic field strength would allow the system to attenuate gamma radiation as well. These capabilities could be very useful in nuclear research and nuclear medicine applications.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A panel assembly that is transparent to a preselected form of radiation and that is configured to selectively vary the transmissivity of the preselected form of radiation through the panel assembly, the panel assembly comprising:
   a first transparent sub panel including a plurality of generally parallel, spaced, first wires extending therethrough from a first edge to an opposite, second edge with at least an end of each first wire connected to an end of an adjacent first wire at one of the first edge or the second edge to form a plurality of U-shaped conductive elements, each U-shaped conductive element having an electromagnetic coil wound thereabout at or about the first edge or the second edge of the first transparent sub panel to form a "horseshoe" electromagnet at each of the connected first wires;
   a second transparent sub panel including a plurality of generally parallel, spaced, second wires extending therethrough from a third edge to an opposite, fourth edge with at least an end of each second wire connected to an end of an adjacent second wire at one of the third edge or the fourth edge to form a second plurality of U-shaped conductive elements, each U-shaped conductive element of the second plurality having an electromagnetic coil wound thereabout at or about the third edge or the fourth edge of the second transparent sub panel to form a "horseshoe" electromagnet at each of the connected second wires; and
   a magneto-rheological fluid reservoir sandwiched between the first transparent sub panel and the second transparent panel, the reservoir being structured to house a volume of a magneto-rheological fluid.

2. The panel assembly of claim 1, further comprising a volume of magneto-rheological fluid disposed in the reservoir, wherein the magneto-rheological fluid comprises a quantity of magnetic particles.

3. The panel assembly of claim 2, wherein the reservoir comprises a reservoir extension which extends from the reservoir beyond one of the first, second, third or fourth edges of the first and second sub panels, and wherein the magnetic particles are disposed in the reservoir extension when none of the electromagnetic coils are energized.

4. The panel assembly of claim 2, wherein the magnetic particles comprise iron.

5. The panel assembly of claim 2, wherein the magneto-rheological fluid comprises an alcohol.

6. The panel assembly of claim 2, wherein a concentration of the magnetic particles in a portion of the panel assembly increases the strength of that portion.

7. The panel assembly of claim 1, wherein the first wires and the second wires extend at an angle of approximately 90° with respect to each other.

8. The panel assembly of claim 1, further comprising a control system structured to separately control a supply of electrical current supplied to each of the respective electromagnetic coils.

9. The panel assembly of claim 8, wherein the preselected form of radiation is electromagnetic radiation.

10. The panel assembly of claim 9, further comprising an electromagnetic radiation detector structured to track a path of the electromagnetic radiation and supply the path to the control system, and to selectively activate the electromagnetic coils which correspond to a location in the panel assembly which intersects with the path.

11. The panel assembly of claim 10, wherein the electromagnetic radiation detector is one or more photo sensors.

12. The panel assembly of claim 11, wherein the panel assembly has an inside surface and an outside surface and the photo sensors are supported adjacent the inside surface.

13. The panel assembly of claim 8, wherein the preselected form of radiation comprises thermal neutrons.

14. The panel assembly of claim 8, wherein the preselected form of radiation comprises X-rays.

15. The panel assembly of claim 1, wherein the first transparent sub panel and the second transparent sub panel are each formed from a clear glass or plastic.

16. The panel assembly of claim 1, wherein the first wires and the second wires, respectively, are embedded within the first transparent panel and the second transparent panel.

17. The panel assembly of claim 1, wherein the first wires and the second wires, respectively, are attached to the first transparent panel and the second transparent panel.

* * * * *